US006888501B2

(12) United States Patent
Hirayama et al.

(10) Patent No.: US 6,888,501 B2
(45) Date of Patent: May 3, 2005

(54) RADIO RECEPTION APPARATUS AND DIRECTIVITY RECEPTION METHOD

(75) Inventors: Yoshiyasu Hirayama, Yokohama (JP); Takahisa Aoyama, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 8 days.

(21) Appl. No.: 10/250,457

(22) PCT Filed: Sep. 18, 2002

(86) PCT No.: PCT/JP02/09571

§ 371 (c)(1),
(2), (4) Date: Jul. 2, 2003

(87) PCT Pub. No.: WO03/030404

PCT Pub. Date: Apr. 10, 2003

(65) Prior Publication Data

US 2004/0058711 A1 Mar. 25, 2004

(30) Foreign Application Priority Data

Sep. 27, 2001 (JP) ........................................ 2001-296618

(51) Int. Cl.[7] .................................................. H01Q 3/00
(52) U.S. Cl. ........................ 342/377; 342/371; 342/375
(58) Field of Search .............................. 342/368, 371, 342/372, 375, 377; 455/561, 562.1

(56) References Cited

U.S. PATENT DOCUMENTS

| 4,246,585 | A | * | 1/1981 | Mailloux ................... 342/373 |
| 5,218,359 | A | | 6/1993 | Minamisono |
| 6,064,338 | A | | 5/2000 | Kobayakawa |

| 2001/0049295 | A1 | | 12/2001 | Matsuoka et al. |
| 2002/0137548 | A1 | * | 9/2002 | Miya .......................... 455/562 |

FOREIGN PATENT DOCUMENTS

| EP | 1170878 | 1/2002 |
| GB | 2339078 | 1/2000 |
| JP | 05041607 | 2/1993 |
| JP | 2000353997 | 12/2000 |
| JP | 2001203620 | 7/2001 |
| JP | 2001251233 | 9/2001 |

OTHER PUBLICATIONS

International Search Report dated Jan. 21, 2003.
T. Matsumoto, et al., "A Technical Survey and Future Prospects of Adaptive Array Antennas in Mobile Communications" NTT Docomo Technical Journal vol. 5, No. 4, P25–36.
Supplemental European Search Report dated May 7, 2004.

* cited by examiner

*Primary Examiner*—Dao Phan
(74) *Attorney, Agent, or Firm*—Stevens, Davis, Miller & Mosher, LLP

(57) ABSTRACT

Delay profile creation sections 7 and 8 create a delay profile for each of fixed directivity reception signals combined using a plurality of fixed weight patterns. A path search section 11 detects a delay profile in which the maximum peak has appeared. An initial value weight selection section 12 selects the fixed weight corresponding to the delay profile in which the maximum peak has appeared as an initial value weight. An adaptive array antenna reception control section 13 uses this initial value weight as the initial value of an optimization algorithm to calculate the optimal weight of the adaptive array antenna. Thus, it is possible to reduce the time required to calculate the optimal weight by means of the optimization algorithm.

9 Claims, 11 Drawing Sheets

RADIO RECEPTION APPARATUS AND DIRECTIVITY RECEPTION METHOD

TECHNICAL FIELD

The present invention relates to a radio reception apparatus and directivity reception method that use adaptive antenna technology whereby signal transmission/reception is performed with directivity controlled adaptively.

BACKGROUND ART

In digital radio communications, expectations have been placed on adaptive array antenna (hereinafter referred to as "AAA") technology, whereby weighted addition is performed of antenna element outputs from a plurality of antenna elements using a complex coefficient (hereinafter referred to as "weight"), as a technology for improving communication quality. With this AAA technology, interference waves can be suppressed by controlling directivity adaptively, making use of the fact that the direction of arrival differs for transmission waves from a plurality of communicating parties. AAA technology is therefore suitable as a method of canceling interference waves from other channels.

This AAA technology is described in detail in, for example, NTT DoCoMo Technical Journal Vol. 5 No. 4, P25–P36.

With AAA technology, waves arriving from various directions are received by a plurality of antenna elements, and a final reception signal is obtained by a process of combination using an appropriate weight on each reception signal according to its direction of arrival. Therefore, reception quality is greatly affected by whether or not the weights are appropriate.

For this reason, various weight control algorithms for finding appropriate weights have been devised in AAA technology. A typical algorithm uses a desired signal waveform as prior knowledge, and also uses the root-mean-square value of the error of antenna element outputs with respect to a reference signal (desired signal) as an output evaluation function.

In this case, an LMS (Least Mean Square) or RLS (Recursive Least Squares) algorithm commonly used by a conventional adaptive equalizer can be employed.

However, in mobile communications, transmission path characteristics fluctuate at high speed since terminals are moving, and there are consequently problems with trackability in conventional AAA technology. That is to say, it is necessary to track the direction of arrival of transmission waves fluctuating at high speed, and find appropriate weights successively in a short time.

Thus, with a weight control algorithm, if the speed of changes in the direction of arrival of a transmission wave due to movement of a mobile terminal exceeds the optimal weight calculation time, reception quality will degrade. There is consequently a need for an apparatus and method that will enable optimal weights for an adaptive array antenna to be calculated even a little faster.

DISCLOSURE OF INVENTION

It is an object of the present invention to provide a radio reception apparatus and directivity reception method that enable an optimal weight to be calculated in a short time according to the direction of arrival of a transmission wave when adaptive array antenna technology is used.

This object is achieved by creating a plurality of fixed directivity reception signals using a plurality of fixed weight patterns, estimating the direction of arrival of a transmission wave based on the delay profile of each fixed directivity reception signal, and calculating the optimal weight of the adaptive array antenna based on that direction.

BEST MODE FOR CARRYING OUT THE INVENTION

With reference now to the accompanying drawings, embodiments of the present invention will be explained in detail below.

Embodiment 1

Figure 1:
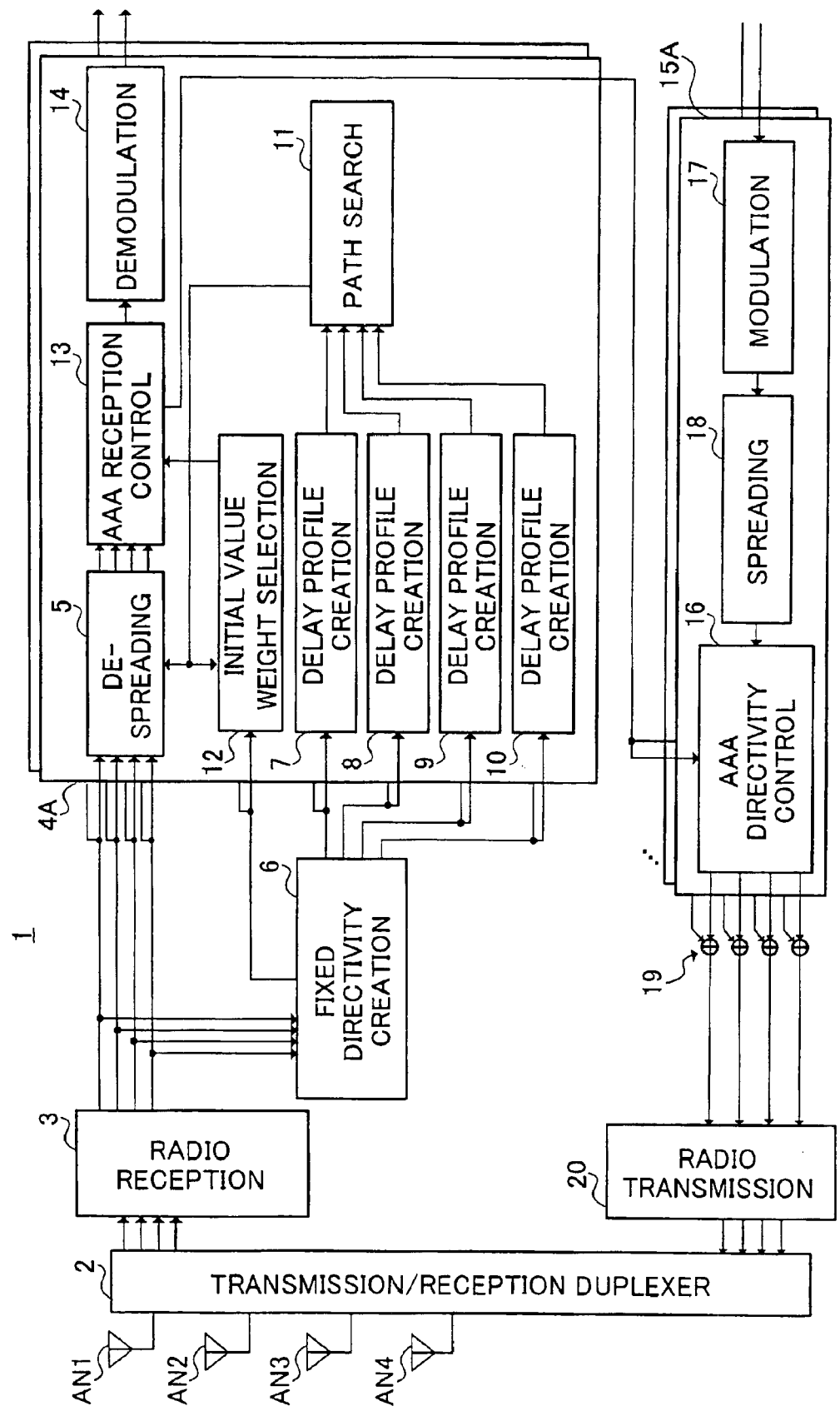
FIG. 1 is a block diagram showing the configuration of a radio base station apparatus according to Embodiments 1 through 4 of the present invention.

In FIG. 1, reference numeral 1 denotes the overall configuration of a radio base station apparatus. Radio base station apparatus 1 has a plurality of array antennas AN1 through AN4, and signals received by array antennas AN1 through AN4 are input to a transmission/reception duplexer 2. Transmission/reception duplexer 2 sends reception signals to a radio reception section 3. Radio reception section 3 performs processing such as down-conversion and analog-digital conversion processing on the reception signals, and then sends the processed signals to the despreading section 5 of reception signal processing circuits 4A . . . , one of which is provided for each communicating radio terminal, and also to a fixed directivity creation section 6.

Figure 2:
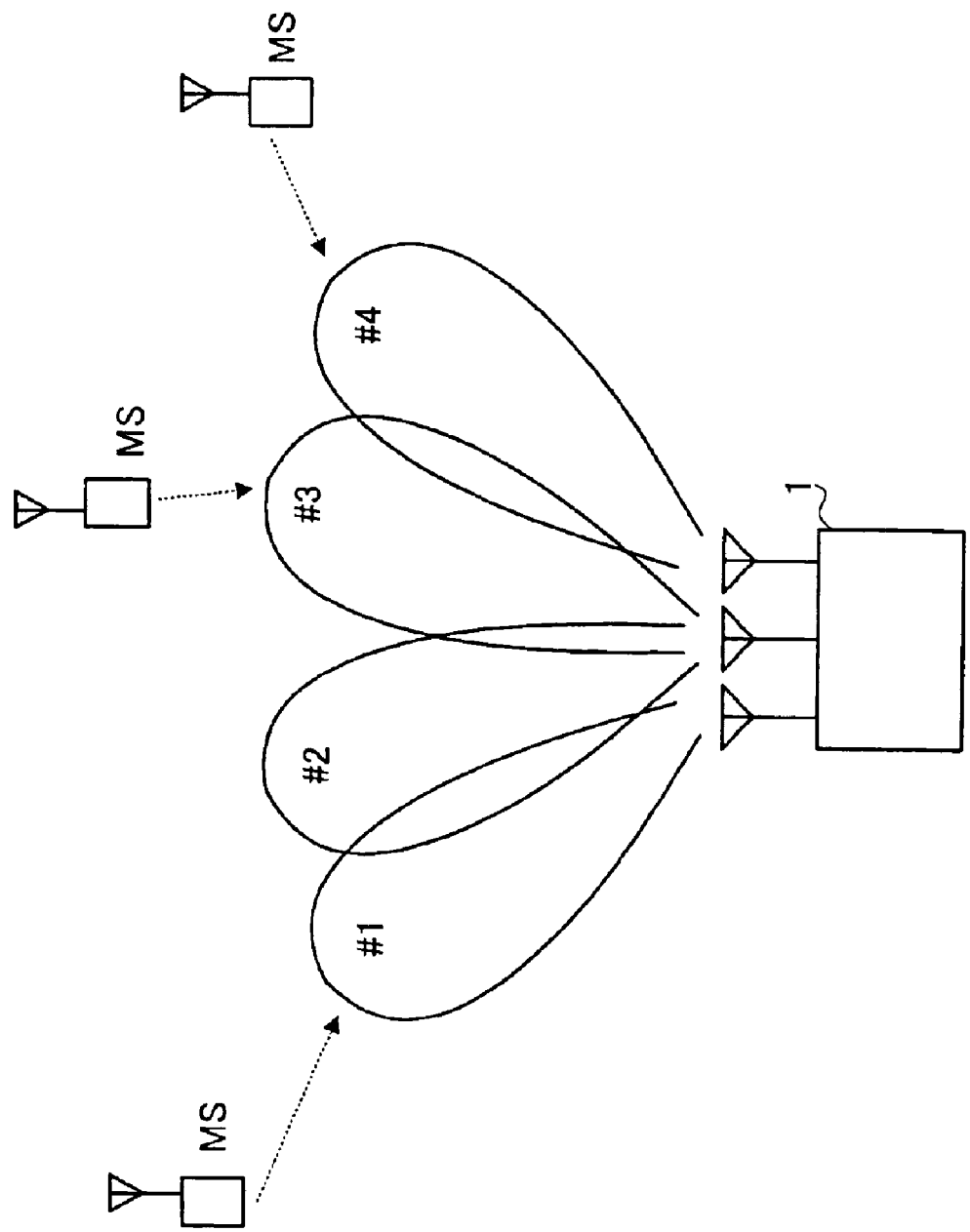
FIG. 2 is a drawing showing directivity patterns created by a fixed directivity creation section.
Figure 3A:
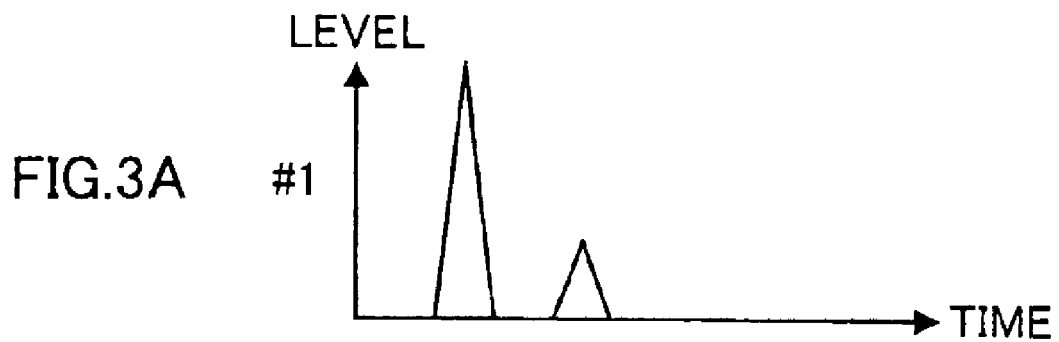
FIG. 3A is a drawing showing the delay profile of directivity direction #1 in Embodiment 1.
Figure 3B:
FIG. 3B is a drawing showing the delay profile of directivity direction #2 in Embodiment 1.
Figure 3C:
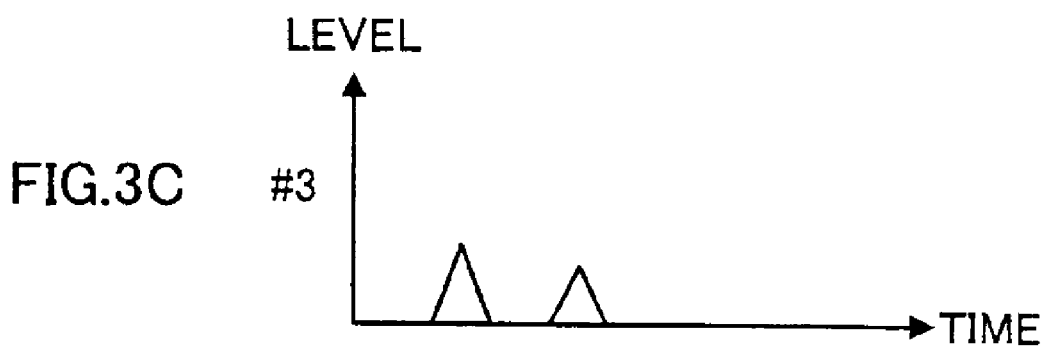
FIG. 3C is a drawing showing the delay profile of directivity direction #3 in Embodiment 1.
Figure 3D:
FIG. 3D is a drawing showing the delay profile of directivity direction #4 in Embodiment 1.

Fixed directivity creation section 6 creates a plurality of fixed directivities #1 through #4 as shown in FIG. 2. Actually, fixed directivity creation section 6 creates four directivity reception signals by multiplying reception signals from the four array antennas by different fixed weight patterns, and combining these in step. That is to say, fixed directivity creation section 6 creates four fixed directivities #1 through #4 using four fixed weight patterns.

Then the directivity reception signal obtained on the basis of fixed directivity #1 in FIG. 2 is sent to delay profile creation section 7, the directivity reception signal obtained on the basis of fixed directivity #2 is sent to delay profile creation section 8, the directivity reception signal obtained on the basis of fixed directivity #3 is sent to delay profile creation section 9, and the directivity reception signal obtained on the basis of fixed directivity #4 is sent to delay profile creation section 10.

For the sake of simplicity, the following description focuses only on reception signal processing circuit 4A among the plurality of reception signal processing circuits 4A . . . equivalent in number to the number of radio terminals. One of delay profile creation sections 7 through 10 is provided for each fixed directivity reception signal (that is, for each fixed directivity pattern), and creates a delay profile for the corresponding directivity reception signal obtained by fixed directivity creation section 6.

Specifically, delay profile creation sections 7 through 10 despread a fixed directivity reception signal using a spreading code sequence corresponding to a radio terminal, and create a delay profile by expanding the resultant signal level in the time direction.

Delay profile data created by delay profile creation sections 7 through 10 is sent to a path search section 11 functioning as an arrival direction estimation section. Path search section 11 detects a peak for each delay profile, and sends the peak detection result to a despreading section 5 and initial value weight selection section 12.

Despreading section 5 is composed of matched filters. The matched filters restore the signals prior to spreading by multiplying the reception signals by a spreading code corresponding to the radio terminal at the timing of the peak detected by path search section 11. Despread signals are sent to an adaptive array antenna reception control section (AAA reception control section) 13.

Initial value weight selection section 12 has as input the peak detection result from path search section 11 and the plurality of fixed weights (that is, the plurality of fixed weight patterns) used when fixed directivities are created by fixed directivity creation section 6. Then initial value weight selection section 12 selects from the plurality of fixed weights the fixed weight corresponding to the delay profile in which the maximum peak was detected, and sends this to AAA reception control section 13.

AAA reception control section 13 functions as an adaptive directivity creation section, and combines a plurality of reception signals by applying an optimal weight to the plurality of reception signals obtained by means of despreading section 5. At this time, AAA reception control section 13 calculates the optimal weight whereby the reception signal level is maximized by executing a predetermined algorithm.

AAA reception control section 13 according to this embodiment calculates the optimal weight by executing an LMS (Least Mean Square) algorithm as the optimization algorithm. That is to say, AAA reception control section 13 executes an optimization algorithm represented by the following equation.

$$W(m+1)=W(m)+\mu X(m)e(m) \tag{1}$$

Here, $W(m)$ denotes the weight at time m, $X(m)$ the input signal at time m, $e(m)$ the error signal at time m, $\mu$ the step size, and m the time.

At this time, AAA reception control section 13 according to this embodiment uses the fixed weight selected by initial value weight selection section 12 as initial value weight $W(0)$, and by this means, AAA reception control section 13 can calculate the optimal weight in a shorter time than when an algorithm is executed in a non-directivity state.

The adaptive directivity reception signal created by AAA reception control section 13 using the optimal weight is sent to a demodulation section 14. Demodulation section 14 comprises a RAKE combiner, demodulator, and SIR measuring device, and obtains demodulated data by performing RAKE combination and then demodulation on the input adaptive directivity reception signal.

The optimal weight calculated and used by AAA reception control section 13 is sent to the adaptive array antenna directivity control section (AAA directivity control section) 16 of transmission signal processing circuits 15A. . . . AAA directivity control section 16 uses the input optimal weight to create a directivity transmission signal to be transmitted to the corresponding radio terminal.

A brief description will now be given of the transmission system of radio base station apparatus 1. In the transmission system, transmit data corresponding to each radio terminal is input to the modulation section 17 of transmission signal processing circuits 15A. . . . Modulation section 17 executes coding processing, and also QPSK modulation processing, etc., as primary modulation, on the transmit data, and then sends the processed signal to a spreading section 18. Spreading section 18 spreads the transmit data on a chip-by-chip basis using a predetermined spreading code, and sends the spread signal to AAA directivity control section 16.

AAA directivity control section 16 creates directivity transmission signals using the optimal weight input from AAA reception control section 13. Directivity transmission signals for each radio terminal output from AAA directivity control section 16 of transmission signal processing circuits 15A . . . corresponding to the respective radio terminals are added by adders 19, then sent to a radio transmission section 20. Radio transmission section 20 executes digital-analog conversion processing and up-conversion processing on the added directivity transmission signals, and sends the processed signals to array antennas AN1 through AN4 via transmission/reception duplexer 2. By this means, directivity transmission signals are generated for each radio terminal with optimal directivity for each radio terminal obtained during reception.

In the above configuration, in radio base station apparatus 1 a plurality of fixed directivity reception signals are first created by fixed directivity creation section 6 by combining the outputs of a plurality of array antennas AN1 through AN4, using a plurality of fixed weight patterns. Then delay profiles are created for the plurality of fixed directivity reception signals by delay profile creation sections 7 through 10.

Next, path search section 11 estimates the maximum path direction by detecting the delay profile in which the maximum peak appears from among the plurality of delay profiles. Then information on the direction in which the maximum path occurred is sent to initial value weight selection section 12. For example, when, as illustrated in FIG. 3, delay profiles such as those shown in FIG. 3A, FIG. 3B, FIG. 3C, and FIG. 3D are created by delay profile creation sections 7 through 10, respectively, since the maximum peak appears in the delay profile created by delay profile creation section 7 (FIG. 3A), path search section 11 sends information indicating this fact to initial value weight selection section 12.

Initial value weight selection section 12 then selects, from among the plurality of (in this embodiment, four) fixed weight patterns input from fixed directivity creation section 6, the fixed weight pattern used in creating the fixed directivity reception signal input to delay profile creation section 7, and sends this fixed weight pattern to AAA reception control section 13.

AAA reception control section 13 calculates the optimal weight, whereby the reception signal level can be maximized, by executing the optimization algorithm of above Equation (1), taking the fixed weight pattern input from initial value weight selection section 12 as the initial value weight. By this means, the optimal weight is calculated from the fixed weight pattern of the maximum peak direction, and therefore the optimal weight can be calculated in a short time.

It should be noted that the maximum peak direction is a direction found by means of a limited number of directivities (in this embodiment, four), and is not necessarily the direction in which the maximum reception signal level is obtained. That is to say, the optimal weight calculated by AAA reception control section 13 can be said to be a weight obtained by increasing the directivity resolution above that of the fixed weight pattern for which the best result was obtained.

Thus, according to the above configuration, by calculating the optimal weight of an adaptive array antenna using a fixed weight corresponding to the delay profile in which the maximum peak is detected as the initial value weight of the optimization algorithm, it is possible to reduce the time required to calculate the optimal weight by means of the optimization algorithm.

Embodiment 2

A radio base station apparatus according to this embodiment has a similar configuration to that in Embodiment 1, but the initial value weight processing by initial value weight selection section 12 in FIG. 1 differs from that in Embodiment 1 described above. This embodiment will therefore be described with reference to FIG. 1 used for Embodiment 1.

This embodiment is for handling a case where delay profiles such as those shown in FIG. 4A through FIG. 4D are created by delay profile creation sections 7 through 10. That is to say, it is assumed that delay profiles such as those shown in FIG. 4A through FIG. 4D are created by delay profile creation sections 7 through 10, respectively. On receiving this information from path search section 11, initial value weight selection section 12 calculates a weight corresponding to the information obtained from path search section 11 using fixed weights input from fixed directivity creation section 6, and sends the calculated weight to AAA reception control section 13.

Figure 4A:
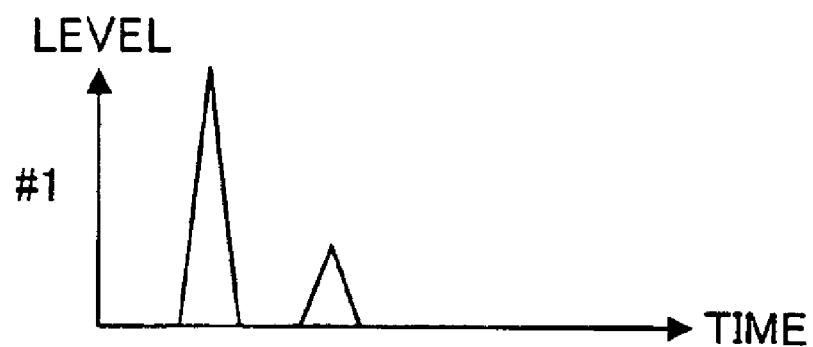
FIG. 4A is a drawing showing the delay profile of directivity direction #1 in Embodiment 2.
Figure 4B:
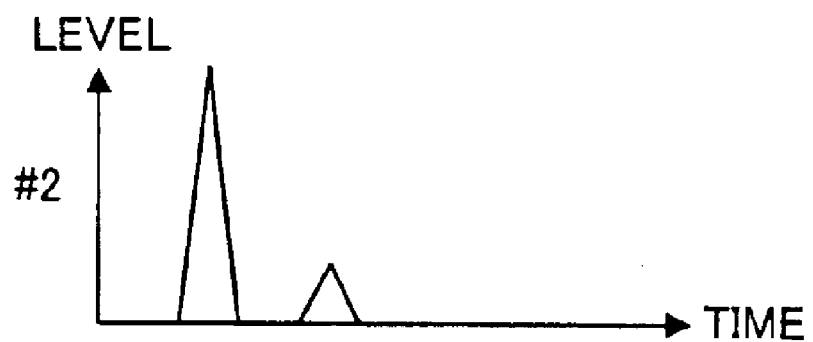
FIG. 4B is a drawing showing the delay profile of directivity direction #2 in Embodiment 2.
Figure 4C:
FIG. 4C is a drawing showing the delay profile of directivity direction #3 in Embodiment 2.
Figure 4D:
FIG. 4D is a drawing showing the delay profile of directivity direction #4 in Embodiment 2.
Figure 5:
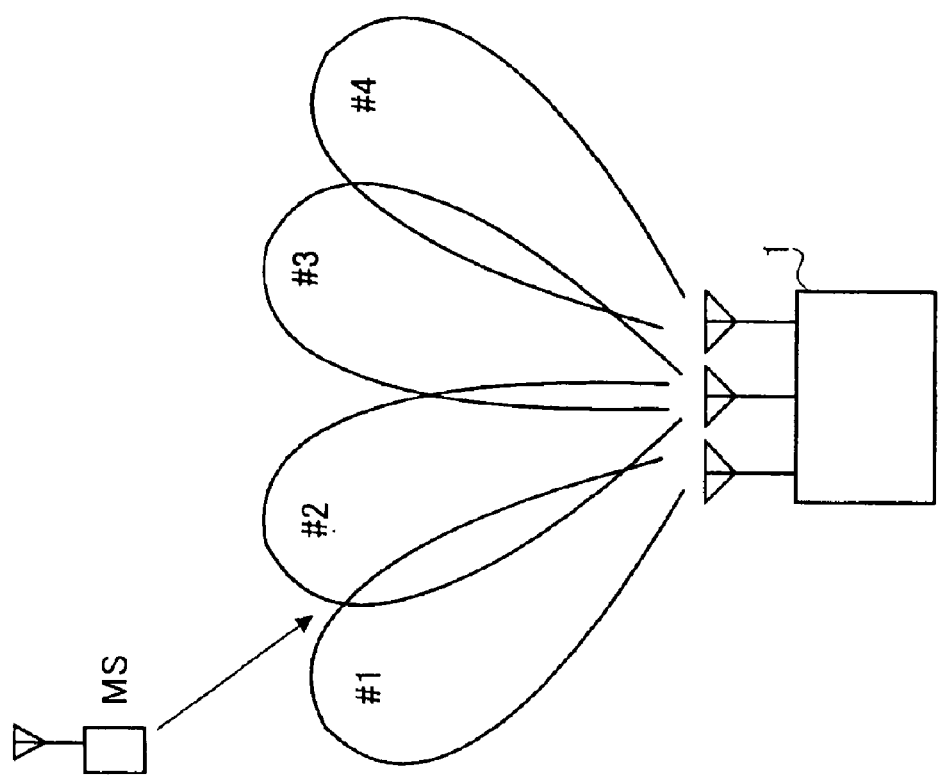
FIG. 5 is a drawing showing the direction of arrival of an arriving wave in Embodiment 2.
Figure 6A:
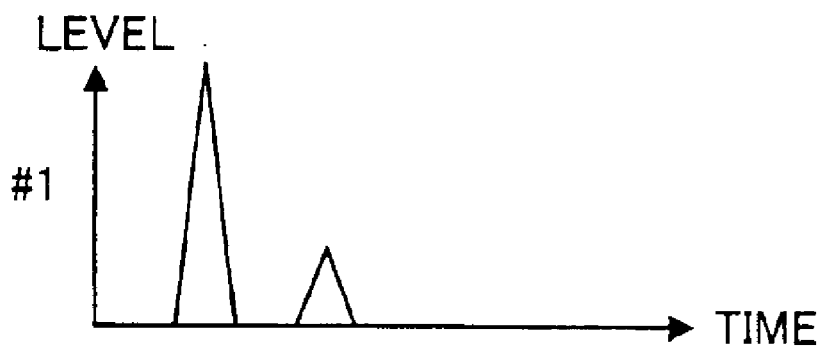
FIG. 6A is a drawing showing the delay profile of directivity direction #1 in Embodiment 3.
Figure 6B:
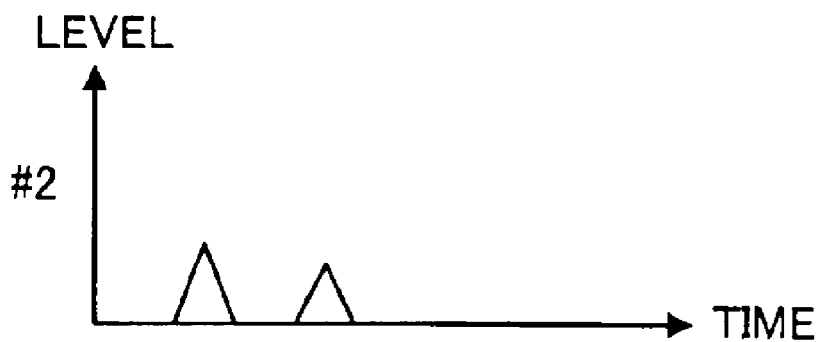
FIG. 6B is a drawing showing the delay profile of directivity direction #2 in Embodiment 3.
Figure 6C:
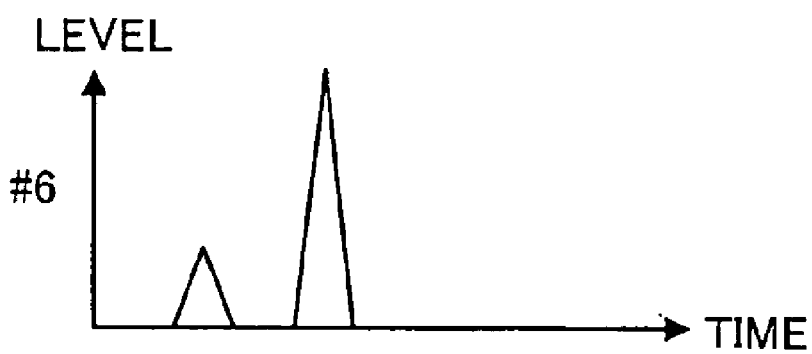
FIG. 6C is a drawing showing the delay profile of directivity direction #3 in Embodiment 3.
Figure 6D:
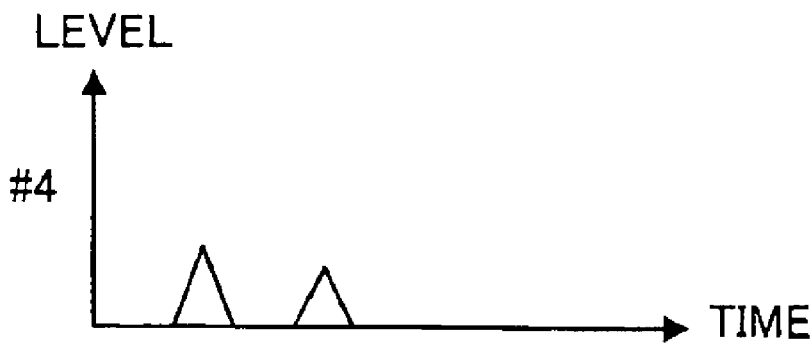
FIG. 6D is a drawing showing the delay profile of directivity direction #4 in Embodiment 3.

Specifically, the fact that the maximum peak and a peak close to the maximum peak are obtained in delay profiles #1 and #2 for different directions, as shown in FIG. 4, suggests that a transmission wave from a radio terminal (MS) is arriving from the direction shown in FIG. 5. Thus, initial value weight selection section 12 does not directly output to AAA reception control section 13 any of the four fixed weight patterns input from fixed directivity creation section 6, but calculates a new weight from the fixed weight patterns, and outputs this new weight to AAA reception control section 13.

In the example illustrated in FIG. 4A through FIG. 4D and FIG. 5 a transmission wave arrives from a direction between fixed directivity directions #1 and #2, and therefore initial value weight selection section 12 calculates a new weight corresponding to the direction between fixed directivity directions #1 and #2, using the fixed weight pattern corresponding to fixed directivity direction #1 and the fixed weight pattern corresponding to fixed directivity #2. This new weight can be calculated using a simple proportionality calculation.

AAA reception control section 13 calculates the optimal weight by executing an optimization algorithm, taking the new weight calculated by initial value weight selection section 12 as the initial value.

Thus, according to the above configuration, when the maximum peak and a peak close to the maximum peak are detected in delay profiles for different directions, by calculating a weight corresponding to the direction between the directions in which the peaks appeared based on the fixed weights of those directions, and using this calculated weight as the initial value weight of the optimization algorithm, it is possible to reduce the time required to calculate the optimal weight by means of the optimization algorithm even when a transmission wave from a radio terminal is not in the center of a fixed directivity direction.

In the above embodiment, a case has been described in which a plurality of paths are detected from different directivity directions, but the present invention is not limited to this, and similar processing can also be performed, and the same kind of effect as described in the above embodiment can also be obtained, when the same path is detected from different directivities.

Embodiment 3

A radio base station apparatus according to this embodiment has a similar configuration to that in Embodiment 1, but the initial value weight processing by initial value weight selection section 12 in FIG. 1 differs from that in Embodiment 1 described above. This embodiment will therefore be described with reference to FIG. 1 used for Embodiment 1.

This embodiment is for handling a case where delay profiles such as those shown in FIG. 6A through FIG. 6D are created by delay profile creation sections 7 through 10. That is to say, it is assumed that delay profiles such as those shown in FIG. 6A through FIG. 6D are created by delay profile creation sections 7 through 10, respectively. On receiving this information from path search section 11, initial value weight selection section 12 calculates a weight corresponding to the information obtained from path search section 11 using fixed weights input from fixed directivity creation section 6, and sends the calculated weight to AAA reception control section 13.

Figure 7:
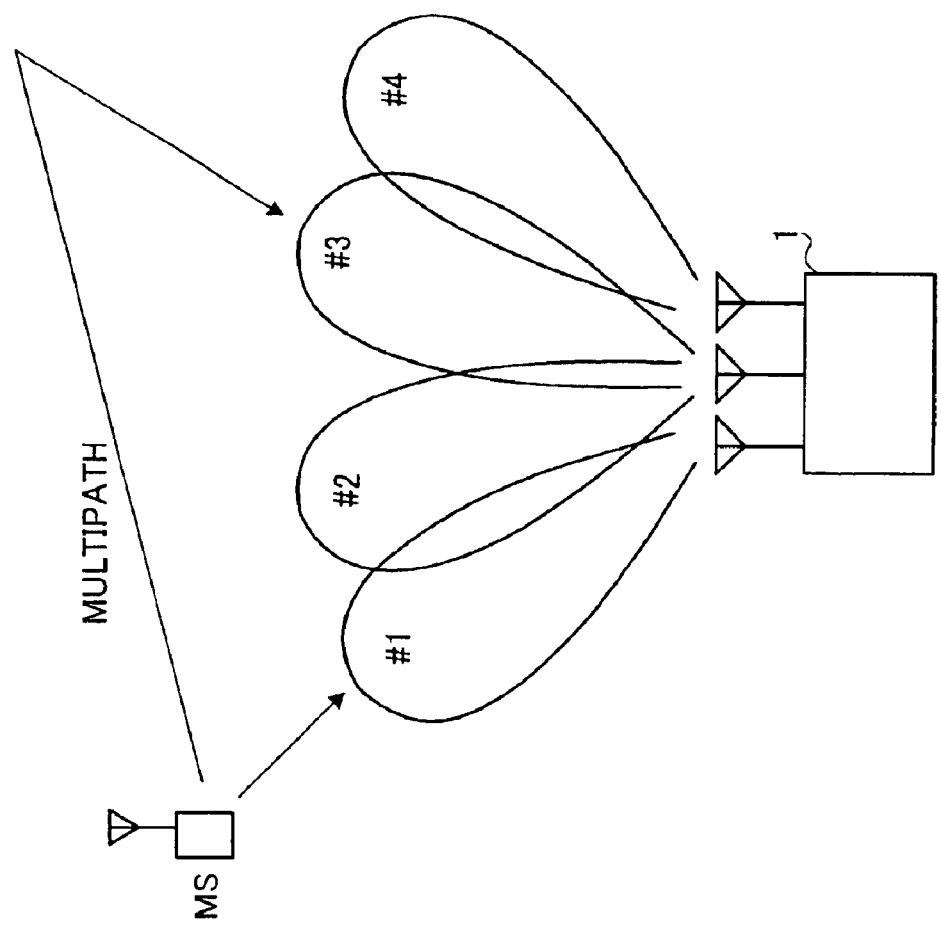
FIG. 7 is a drawing showing directions of arrival of arriving waves in Embodiment 3.

Specifically, the fact that the maximum peak and a peak close to the maximum peak are obtained from non-adjacent fixed directivity directions #1 and #3, as shown in FIG. 6A through FIG. 6D, suggests that multipath transmission waves from a radio terminal (MS) are arriving from a plurality of directions as shown in FIG. 7. Thus, considering the fact that these multipath signals are arriving from a wide range of directions, a broad directivity width that will enable all the paths to be received is used as the initial value weight.

Initial value weight selection section 12 therefore calculates a weight of a broad directivity width using the fixed weights input from fixed directivity creation section 6. In the case of this embodiment, a weight capable of covering directivity directions #1 through #3 is calculated.

AAA reception control section 13 calculates the optimal weight by executing an optimization algorithm, taking the weight with a broad directivity width calculated by initial value weight selection section 12 as the initial value.

Thus, according to the above configuration, when the maximum peak and a peak close to the maximum peak are detected in delay profiles for non-adjacent fixed directivity directions, by calculating a weight that has a broad directivity width enabling all the directions over the range in which peaks were detected to be covered, and using this calculated weight as the initial value weight of the optimization algorithm, it is possible to calculate the optimal weight in a short time without missing transmission waves arriving from various directions.

Embodiment 4

A radio base station apparatus according to this embodiment has a similar configuration to that in Embodiment 1, but the initial value weight processing by initial value weight selection section 12 and optimal weight calculation processing by AAA reception control section 13 in FIG. 1 differ from those in Embodiment 1 described above. This embodiment will therefore be described with reference to FIG. 1 used for Embodiment 1.

Figure 8:
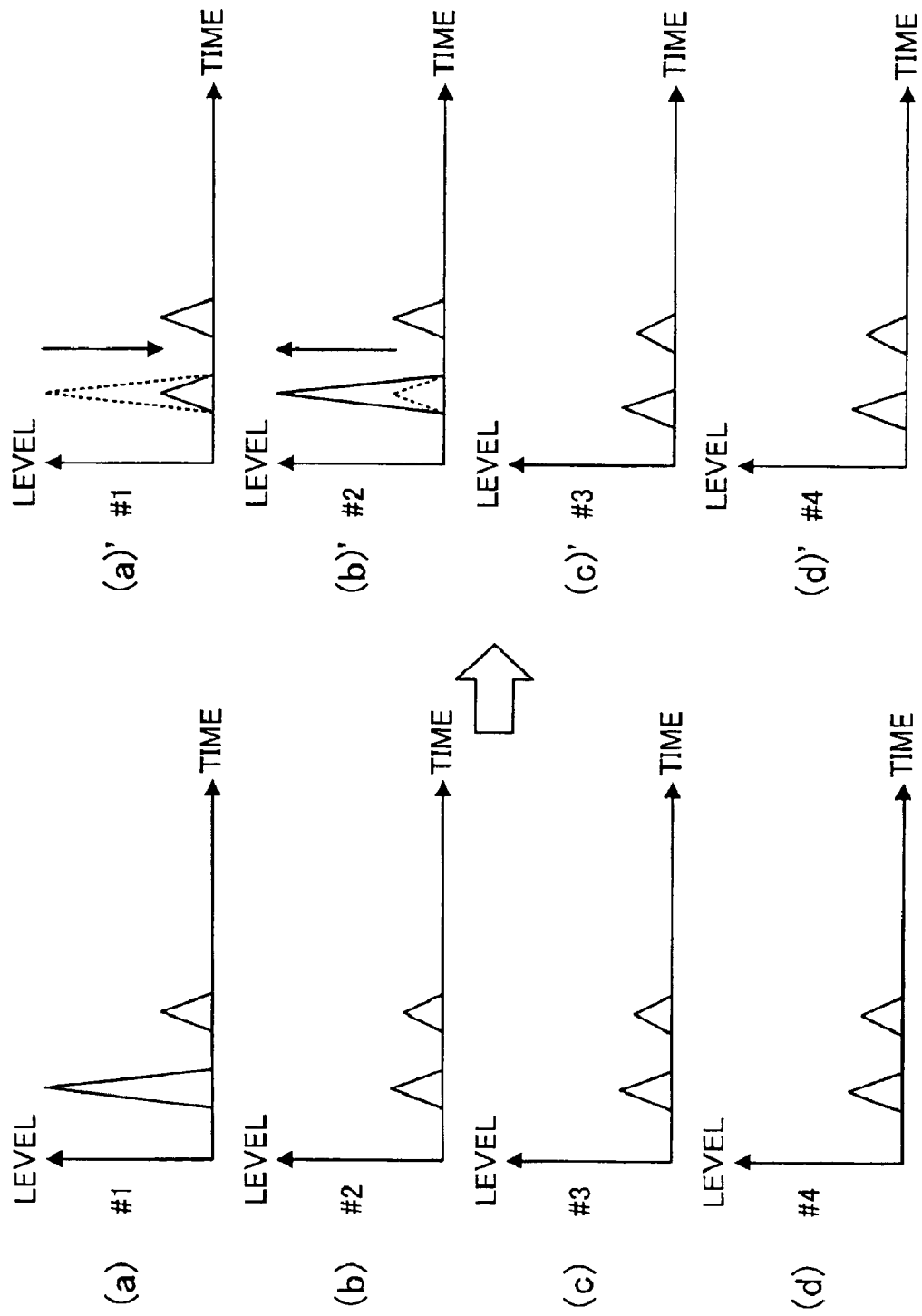
FIG. 8 is a drawing showing delay profiles created by delay profile creation sections in Embodiment 4.

This embodiment is for handling a case where delay profiles such as those shown in FIG. 8 are created by delay profile creation sections 7 through 10. Specifically, it is assumed that delay profiles such as those shown in FIG. 8(*a*) through (*d*) are created by delay profile creation sections 7 through 10 in a certain period, and delay profiles such as those shown in FIG. 8(*a*) through (*d*) are created in a subsequent period.

On receiving this information from path search section 11, initial value weight selection section 12 sends to AAA reception control section 13 the fixed weight pattern corresponding to the delay profile in which the maximum peak appeared from among the fixed weights input from fixed directivity creation section 6. In the case of this embodiment, the maximum peak appears alternately in fixed directivity direction #1 and fixed directivity direction #2, and therefore fixed directivity creation section 6 sends to AAA reception control section 13 alternately the fixed weight pattern corresponding to fixed directivity direction #1 and the fixed weight pattern corresponding to fixed directivity direction #2.

AAA reception control section 13 combines reception signals using the fixed weight input from initial value weight selection section 12 directly as the optimal weight. That is to say, in the case of this embodiment, AAA reception control section 13 does not execute an optimization algorithm.

Figure 9:
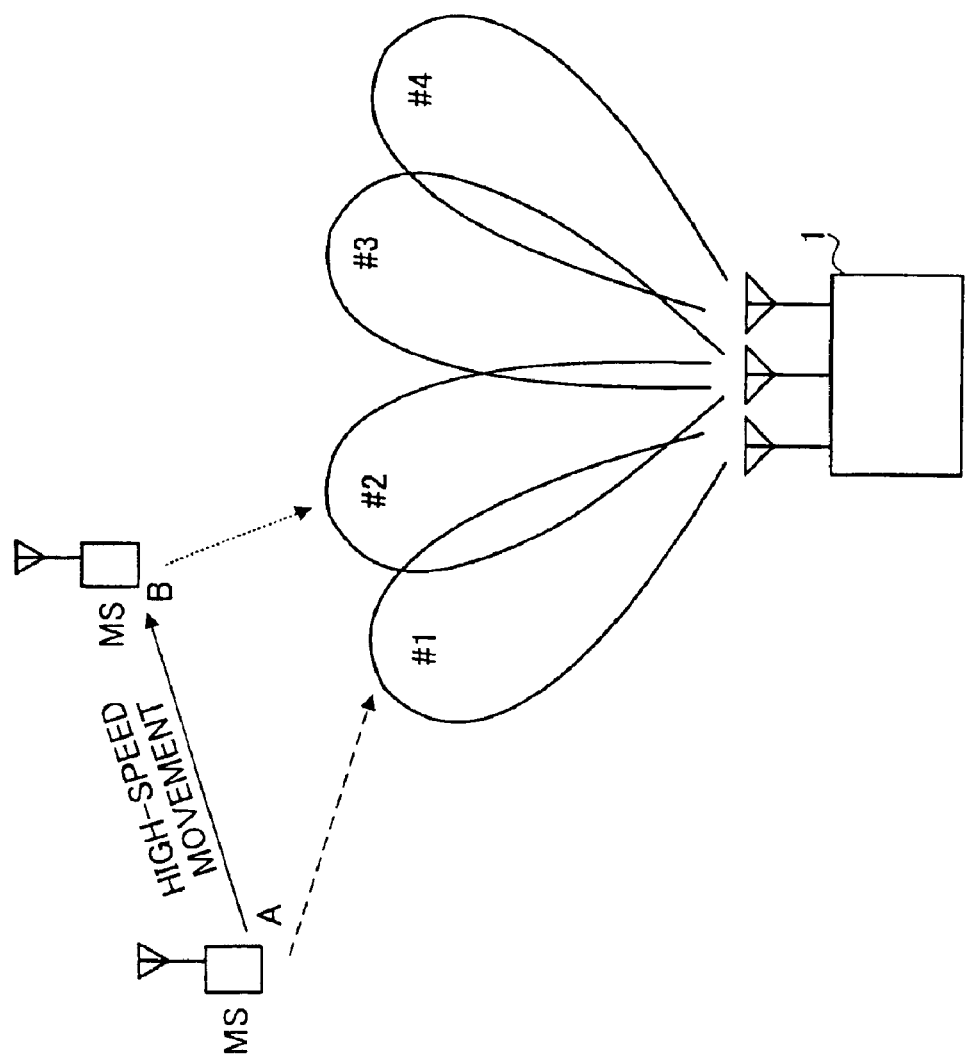
FIG. 9 is a drawing showing the state of arriving waves in Embodiment 4.

Here, the fact that instantaneous switching of the delay profile in which the maximum peak appears, as shown in FIG. 8, is detected, means that there is a high probability that the communicating party is moving at high speed, as shown in FIG. 9.

In such a case, AAA reception control section 13 halts optimal weight calculation by means of an optimization algorithm, and directly uses the fixed weight corresponding to the fixed directivity in which the maximum peak was detected. As a result, AAA reception control section 13 can perform reception operation that tracks a fast-moving radio terminal. That is to say, if an optimization algorithm is executed for a fast-moving radio terminal, reception operation may not be able to keep pace with the high speed of movement due to the calculation time required to find the optimal weight, and reception quality may degrade. This embodiment enables this problem to be effectively avoided.

Thus, according to the above configuration, when instantaneous switching of the delay profile in which the maximum peak appears is detected, by using the fixed weight corresponding to the fixed directivity in which the maximum peak appears as the optimal weight of the adaptive array antenna, it is possible to perform reception operation that keeps pace with a fast-moving radio terminal.

Embodiment 5

Figure 10:
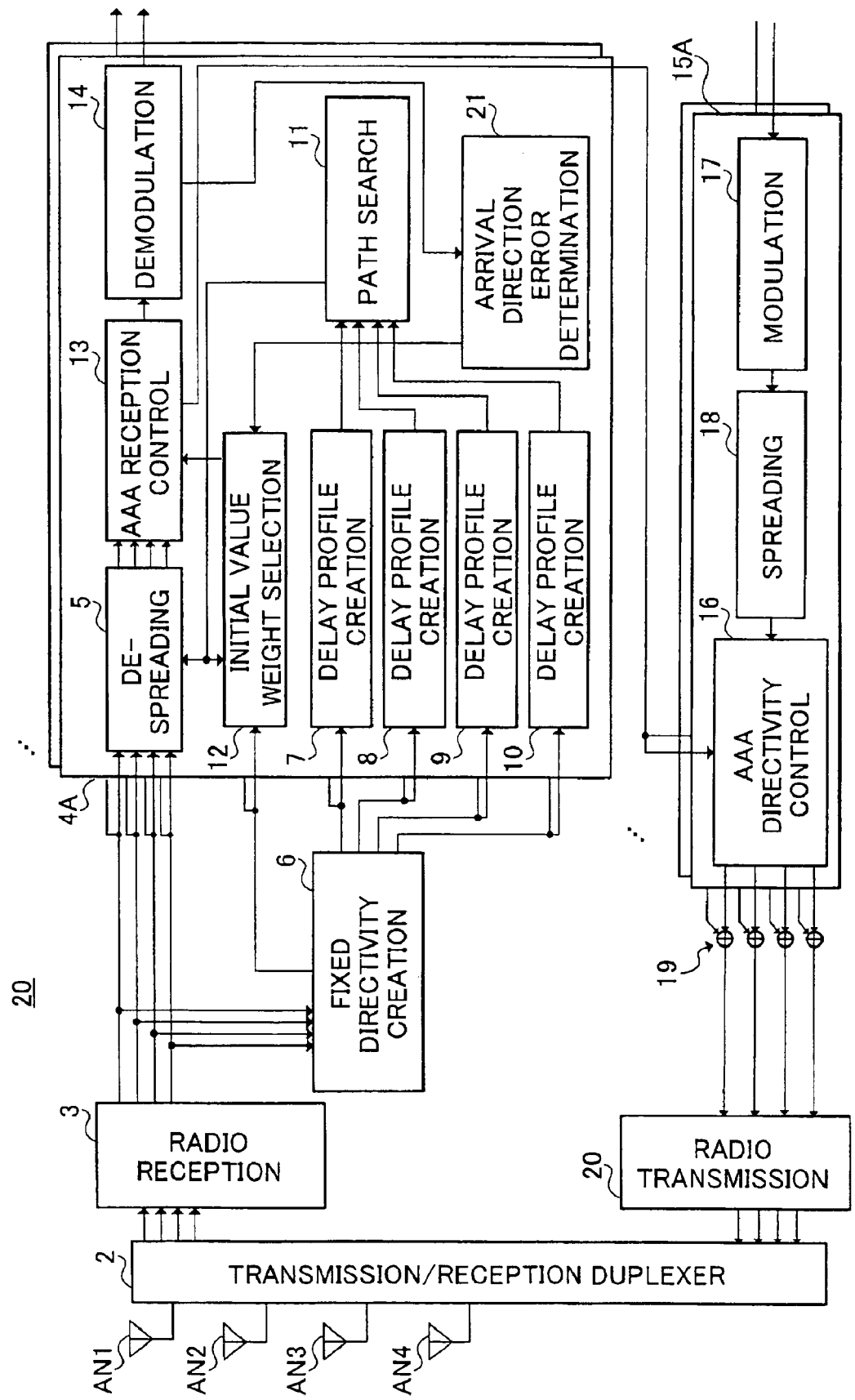
FIG. 10 is a block diagram showing the configuration of a radio base station apparatus according to Embodiments 5 and 6.

In FIG. 10, in which parts identical to those in FIG. 1 are assigned the same codes as in FIG. 1, reference numeral 20 denotes the overall configuration of a radio base station apparatus according to Embodiment 5. Radio base station apparatus 20 has an arrival direction error determination section 21. Arrival direction error determination section 21 has as input an SIR (Signal to Interference Ratio) from demodulation section 14.

Arrival direction error determination section 21 monitors reception signal degradation based on the SIR value. If the SIR value is less than a predetermined threshold value, arrival direction error determination section 21 judges that the optimal weight calculated by AAA reception control section 13 is not actually optimal, and sends the error determination result to initial value weight selection section 12.

When the error determination result is input from arrival direction error determination section 21, initial value weight selection section 12 calculates the initial value weight again, referring to the peak detection result from path search section 11. Initial value weight selection section 12 according to this embodiment has all the functions of initial value weight selection section 12 described above in Embodiment 1 through Embodiment 4, and selects or calculates the best initial value weight according to the input peak detection result and sends this value to AAA reception control section 13.

AAA reception control section 13 calculates the optimal weight by executing the optimization algorithm again using the re-input initial value weight. Thus, in radio base station apparatus 20, when AAA reception control section 13 calculates the optimal weight again, it does so using the initial value weight output from initial value weight selection section 12, thereby enabling the optimal weight to be calculated in a short time.

Thus, according to the above configuration, when an SIR value is less than a predetermined value, the initial value of the optimization algorithm is re-set with reference to the delay profiles, and then the optimal weight is calculated by executing the optimization algorithm again, thereby making it possible to calculate the optimal weight of the adaptive array antenna in a short time, and also to improve reception quality.

Embodiment 6

A radio base station apparatus according to this embodiment has a similar configuration to that in Embodiment 5, but the processing by arrival direction error determination section 21 in FIG. 10 differs from that in Embodiment 5 described above. This embodiment will therefore be described with reference to FIG. 10 used for Embodiment 5.

In the case of this embodiment, arrival direction error determination section 21 extract a TPC bit for controlling transmission power from demodulation section 14. A radio terminal that is a communicating party of radio base station apparatus 20 transmits to radio base station apparatus 20 a TPC bit for controlling the transmission power of radio base station apparatus 20, based on the SIR value when a signal sent from radio base station apparatus 20 is received.

If the TPC bit indicates that the transmission power of radio base station apparatus 20 is to be increased progressively, arrival direction error determination section 21 judges that the optimal weight calculated by AAA reception control section 13 is not actually optimal, and sends the error determination result to initial value weight selection section 12.

That is to say, the fact that a TPC bit received from a radio terminal indicates that the receiving station's transmission power is to be increased suggests that the signal currently being transmitted to the radio terminal is not being sent with appropriate directivity. Considering that AAA directivity control section 16 is sending radio waves with the same directivity as AAA reception control section 13, there is a high probability that the weight calculated by AAA reception control section 13 is not optimal. In such a case, the error determination result is output from arrival direction error determination section 21 in radio base station apparatus 20.

When the error determination result is input from arrival direction error determination section 21, initial value weight selection section 12 calculates the initial value weight again, referring to the peak detection result from path search section 11. Initial value weight selection section 12 according to this embodiment has all the functions of initial value weight selection section 12 described above in Embodiment 1 through Embodiment 5, and selects or calculates the best initial value weight according to the input peak detection result and sends this value to AAA reception control section 13. AAA reception control section 13 calculates the optimal weight by executing the optimization algorithm again using the re-input initial value weight.

Thus, according to the above configuration, when a TPC bit indicates that the transmission power of the local station is to be increased progressively, the initial value of the optimization algorithm is re-set with reference to the delay profiles, and then the optimal weight is calculated by executing the optimization algorithm again, thereby making it possible to calculate the optimal weight of the adaptive array antenna in a short time, and also to improve reception quality.

Embodiment 7

Figure 11:
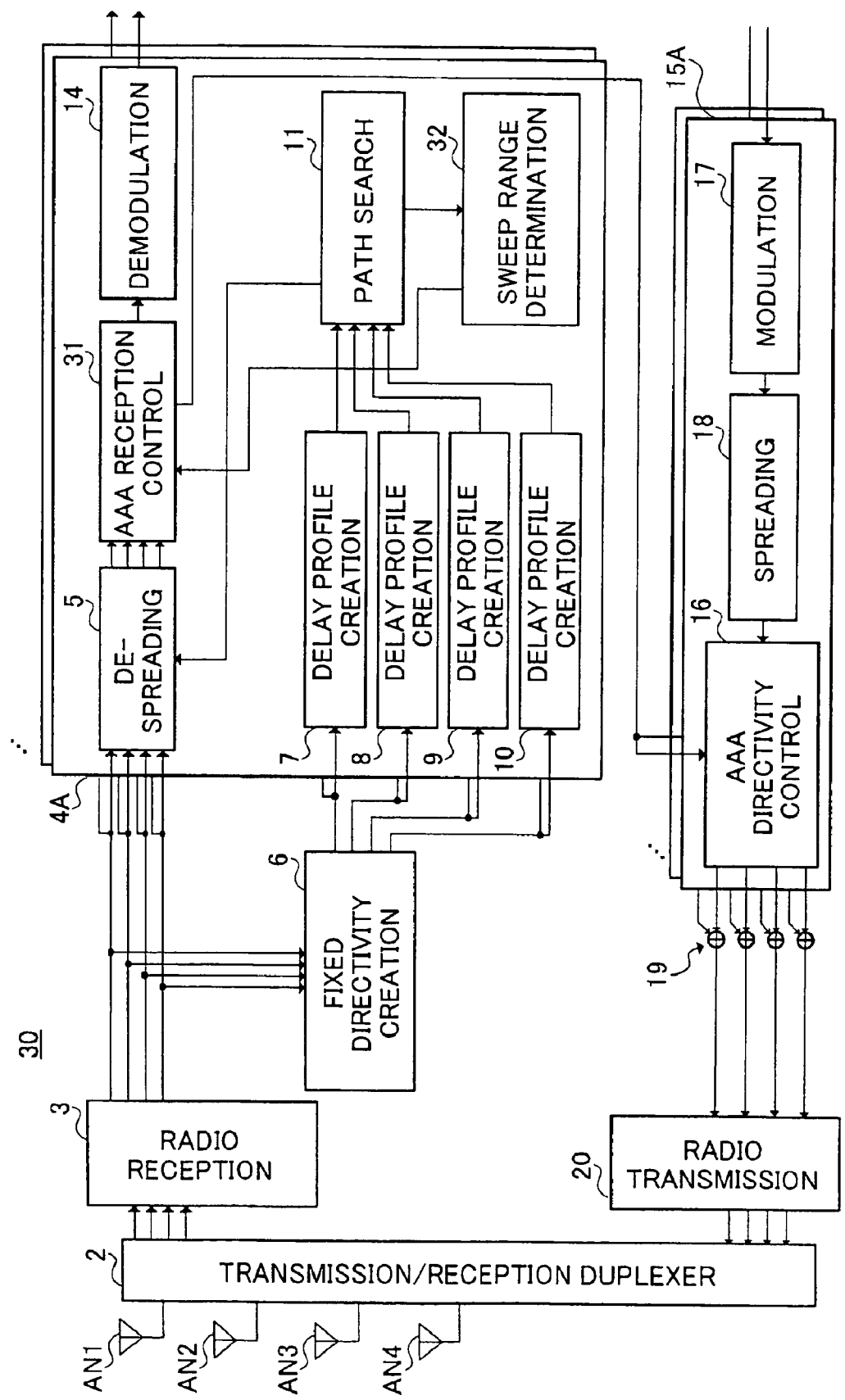
FIG. 11 is a block diagram showing the configuration of a radio base station apparatus according to Embodiment 7.

In FIG. 11, in which parts identical to those in FIG. 1 are assigned the same codes as in FIG. 1, reference numeral 30 denotes the overall configuration of a radio base station apparatus according to Embodiment 7. AAA reception control section 31 of this embodiment does not execute an optimization algorithm as in Embodiment 1 through Embodiment 6, but uses a beam steering technique to direct a beam in the direction in which the reception signal level is highest. This AAA reception control section 31 scans beams within a predetermined scanning range.

In addition to such a configuration, radio base station apparatus 30 has a sweep range selection section 32. Sweep range selection section 32 has as input information from path search section 11 on the direction in which the maximum peak was detected, and selects a scanning range centered on that direction. Sweep range selection section 32 selects the scanning range adaptively according to the peak situation.

For example, if the maximum peak appears in one direction as shown in FIG. 3A through FIG. 3D, a comparatively narrow scanning range centered on that direction is selected. On the other hand, if maximum peaks such as those shown in FIG. 4A through FIG. 4D appear, a scanning range capable of covering the direction in FIG. 4A and the direction in FIG. 4B is selected, centered on a direction between those in FIG. 4A and FIG. 4B. And if peaks appear in non-adjacent directions as shown in FIG. 6A through FIG. 6D, a wide scanning range is selected.

AAA reception control section 31 scans beams within the range selected by sweep range selection section 32. By this means, AAA reception control section 31 can direct a beam in the direction in which the maximum reception level can be obtained in a short time.

Specifically, with a beam search method such as beam steering, the direction within a sector (for example, −60° to +60°) from which a desired signal is coming is estimated, reception is performed with beams directed in a plurality of directions, and the reception direction in which the reception signal level increases is determined (referred to as the "sweep"). An increase in reception signal level here means an increase in the SIR value or RSSI.

The amount of scanning depends on the interval in degrees at which a beam search is performed. With an improvement in the accuracy of the direction of arrival in mind, an interval of approximately 1° is desirable. In this case, processing must be performed for 120 directions, and the amount of processing is extremely large.

However, if only the directivity direction for which a peak has appeared in the delay profile is scanned, as in this embodiment, processing can be reduced.

For example, if delay profile creation is carried out for four fixed directivities, as in this embodiment, to consider a case in which peaks appear in a −15° direction directivity and +15° direction directivity, it is only necessary to scan a scanning range from −30° to 0° centered on −15° and a scanning range from 0° to 30° centered on +15°. As a result, beam search processing can be greatly decreased.

Thus, according to the above configuration, by determining the beam steering scanning range based on peaks in delay profiles, it is possible to narrow down the beam scanning range appropriately, enabling beam search processing to be decreased, and an optimal directivity beam to be created in a shorter time than when the maximum reception level is obtained by sequential scanning over a wide scanning range.

In the above embodiments, a case has been described in which a radio reception apparatus and directivity reception method according to the present invention are applied to a radio base station apparatus, but the present invention is not limited to this, and the same kind of effects as in the above-described embodiments can also be achieved when the present invention is applied to a radio terminal such a mobile phone, for example.

The present invention is not limited to the above-described embodiments, and various variations and modifications may be possible without departing from the scope of the present invention.

A radio reception apparatus according to the present invention has a configuration whereby the direction of a peak that appears in a delay profile is detected, and the weight of an adaptive array antenna is calculated based on that direction.

According to this configuration, the optimal directivity direction is narrowed down to some extent, enabling the optimal weight at which the maximum reception level can be obtained to be calculated in a short time.

A radio reception apparatus according to the present invention has a configuration comprising a plurality of antenna elements, a fixed directivity creation section that creates a plurality of fixed directivity reception signals by combining the outputs of the plurality of antenna elements using a plurality of fixed weight patterns, delay profile creation sections that create a delay profile for each of the plurality of directivity reception signals, an arrival direction estimation section that estimates the direction of arrival of a transmission wave by detecting peaks that appear in the plurality of delay profiles, and an adaptive directivity creation section that creates an adaptive directivity reception signal by calculating an adaptive weight to be multiplied by the plurality of reception signals obtained by the plurality of antenna elements based on said estimated direction and combining the plurality of reception signals using the calculated weight.

According to this configuration, the estimated direction detected by the arrival direction estimation section is a direction close to the direction in which the reception level is maximized, and therefore the direction is narrowed down to some extent. As a result, the adaptive directivity creation section calculates the optimal weight based on this estimated direction, and therefore the time required for optimal weight calculation is reduced.

A radio reception apparatus according to the present invention has a configuration comprising a plurality of antenna elements, a fixed directivity creation section that creates a plurality of fixed directivity reception signals by combining the outputs of the plurality of antenna elements using a plurality of fixed weight patterns, delay profile creation sections that create a delay profile for each of the plurality of directivity reception signals, an arrival direction estimation section that estimates the direction of arrival of a transmission wave by detecting peaks that appear in the plurality of delay profiles, a beam steering reception section that scans directivity beams within a predetermined angular range and acquires a reception signal in the direction in which the highest reception level is obtained, and a scanning range selection section that selects the scanning range of the beam steering reception section based on the estimated direction.

According to this configuration, the beam scanning range of the beam steering reception section is narrowed down to the direction estimated by the arrival direction estimation section, enabling a directivity beam to be directed in the optimal direction in a shorter time than when the maximum reception level is obtained by sequential scanning over a wide scanning range.

In a radio reception apparatus according to the present invention, the adaptive directivity creation section has a configuration whereby the optimal weight is calculated using the fixed weight utilized when creating a directivity reception signal corresponding to a delay profile in which the maximum peak was detected.

According to this configuration, if the optimal weight is calculated using the fixed weights of the fixed directivity creation section of the direction in which the maximum peak was obtained, optimal weight calculation processing can be performed from an optimal weight somewhat close to the optimal weight that the adaptive directivity creation section is attempting to calculate, thereby enabling that calculation time to be reduced.

In a radio reception apparatus according to the present invention, the adaptive directivity creation section has a configuration whereby an adaptive weight is calculated using the fixed weight utilized when creating a directivity reception signal corresponding to a delay profile in which the maximum peak was detected as the initial value weight of the optimization algorithm.

According to this configuration, the fixed weight of the fixed directivity creation section of the direction in which the maximum peak was obtained is used as the initial value of the optimization algorithm, thereby enabling the time required to calculate the optimal weight by means of the optimization algorithm to be reduced.

A radio reception apparatus according to the present invention has a configuration wherein, when a peak value close to the maximum peak value is detected in another delay profile by the arrival direction estimation section, the adaptive directivity creation section calculates the optimal weight using the fixed weight corresponding to the direction between the direction in which that peak value was detected and the direction in which the maximum peak value was detected as the initial value weight of the optimization algorithm.

According to this configuration, since the fact that the maximum peak and a peak close to that maximum peak have been detected in delay profiles for different directions suggests that a path from a communicating party exists between those directions, if a weight corresponding to the direction between the directions in which peaks appeared is calculated from the fixed weight of the directions in which the peaks appeared, and is used as the initial value weight of the optimization algorithm, the time required to calculate the optimal weight by means of the optimization algorithm can be reduced.

A radio reception apparatus according to the present invention has a configuration wherein, when peaks are detected in non-adjacent directivity directions by the arrival direction estimation section, the adaptive directivity creation section calculates the optimal weight using a weight enabling all the directions over the range in which peaks were detected to be covered as the initial value weight of the optimization algorithm.

According to this configuration, the fact that peaks have been detected in non-adjacent directions enables the arrival direction estimation section to estimate that transmission waves are arriving from a wide range of directions, and therefore the adaptive directivity creation section uses as the initial value weight a broad directivity width that enables all these transmission waves to be received. As a result, it is possible to calculate the optimal weight in a short time without missing transmission waves arriving from various directions.

A radio reception apparatus according to the present invention has a configuration comprising an SIR detection section that detects the signal to interference ratio of an adaptive directivity reception signal obtained by an adaptive directivity section, wherein, when the SIR value is less than a predetermined value, the initial value weight of the optimization algorithm is re-set by means of the same processing, and the optimal weight is calculated by executing the optimization algorithm using the re-set initial value weight.

According to this configuration, the fact that a low SIR value has been detected by the SIR detection section suggests a high probability that the weight calculated by the adaptive directivity section is not optimal, and therefore the initial value of the optimization algorithm is re-set with reference to the delay profiles, after which the optimal weight is calculated by executing the optimization algorithm again. As a result, it is possible to calculate the optimal weight in a short time, and also to improve reception quality.

A radio reception apparatus according to the present invention has a configuration wherein, when it is detected by the arrival direction estimation section that the delay profile in which a peak appears switches instantaneously, the adaptive directivity creation section creates an adaptive directivity reception signal using the fixed weight corresponding to the fixed directivity in which the maximum peak was detected as an adaptive weight.

According to this configuration, the fact that instantaneous switching of the delay profile in which a peak appears is detected means that there is a high probability that the communicating party is moving at high speed. In such a case, the adaptive directivity creation section halts adaptive weight calculation, and uses the fixed weight corresponding to the fixed directivity in which the maximum peak was detected. As a result, the adaptive directivity creation section can perform reception operation that tracks a fast-moving radio terminal.

A radio communication apparatus according to the present invention has a configuration comprising an above-described radio reception apparatus and a transmission apparatus that sends a transmission signal with the same directivity as in reception by composing a transmission signal using a weight calculated by the adaptive directivity creation section of the radio reception apparatus, wherein, when, based on a local station transmission power control signal received from a communicating party, that transmission power control signal indicates that local station transmission power is to be increased for a specific period or longer, the adaptive directivity creation section of the radio reception apparatus re-sets the initial value weight of the optimization algorithm by means of the same processing, and calculates the optimal weight by executing the optimization algorithm using the re-set initial value weight.

According to this configuration, the fact that a transmission power control signal received from a communicating party indicates that local station transmission power is to be increased for a long period suggests that the signal currently being transmitted to the communicating party is not being sent with appropriate directivity. Considering that the transmission section is sending radio waves with the same directivity as the adaptive directivity creation section, there is a high probability that the weight calculated by the adaptive directivity creation section is not optimal, and therefore in such a case the initial value is re-set, after which the optimization algorithm is executed again. As a result, it is possible to improve reception quality.

A radio base station apparatus according to the present invention has a configuration provided with an above-described radio reception apparatus.

A directivity reception method according to the present invention creates a plurality of fixed directivity reception signals by combining the outputs of a plurality of antenna elements using a plurality of fixed weight patterns, creates a delay profile for each of the plurality of directivity reception signals, estimates the direction of arrival of a transmission wave by detecting peaks that appear in the plurality of delay profiles, calculates an adaptive weight to be multiplied by a plurality of reception signals obtained by said plurality of antenna elements based on said estimated direction, and creates an adaptive directivity reception signal by combining a plurality of reception signals using the calculated weight.

According to this method, the optimal weight can be calculated from weights narrowed down in the maximum peak direction, thereby enabling the optimal weight to be calculated in a short time.

A directivity reception method according to the present invention creates a plurality of fixed directivity reception signals by combining the outputs of a plurality of antenna elements using a plurality of fixed weight patterns, creates a delay profile for each of the plurality of directivity reception signals, estimates the direction of arrival of a transmission wave by detecting peaks that appear in the plurality of delay profiles, selects a scanning range in accordance with the estimated direction, and scans directivity beams within the selected scanning range and acquires a reception signal in the direction in which the highest reception level is obtained.

According to this method, the directivity beam scanning range is narrowed down to the maximum peak direction estimated as being the direction in which the highest reception level can be obtained, thereby enabling a directivity beam to be directed in the optimal direction in a shorter time than when the maximum reception level is obtained by sequential scanning over a wide scanning range.

As described above, according to the present invention, a radio reception apparatus and directivity reception method that enable an optimal directivity beam to be created in a short time can be implemented by estimating the direction of arrival of a transmission wave from the delay profiles of a plurality of fixed directivity reception signals created using a plurality of fixed weight patterns, and calculating the optimal weight of an adaptive array antenna based on that direction.

Also, a radio reception apparatus and directivity reception method that enable an optimal directivity beam to be created in a short time can be implemented by determining the scanning range of an adaptive array antenna that uses a beam steering method based on peaks in delay profiles.

This application is based on Japanese Patent Application No. 2001-296618 filed on Sep. 27, 2001, entire contents of which are expressly incorporated by reference herein.

INDUSTRIAL APPLICABILITY

The present invention is applicable to a radio base station in a mobile communication system, for example.

What is claimed is:

1. A radio reception apparatus comprising:

a plurality of antenna elements;

a fixed directivity creation section that creates a plurality of fixed directivity reception signals by combining outputs of said plurality of antenna elements using a plurality of fixed weight patterns;

delay profile creation sections that create a delay profile for each of said plurality of fixed directivity reception signals;

an arrival direction estimation section that estimates a direction of arrival of a transmission wave by detecting peaks that appear in said plurality of delay profiles; and an adaptive directivity creation section that creates an adaptive directivity reception signal by calculating an adaptive weight, to be multiplied by a plurality of reception signals obtained by said plurality of antenna elements, based on said estimated direction and combining the reception signals using said calculated adaptive weight, wherein, said adaptive directivity creation section calculates the adaptive weight using a fixed weight, utilized when creating a fixed directivity reception signal corresponding to a delay profile in which a maximum leak was detected, as an initial value weight of an optimization algorithm.

2. A radio reception apparatus comprising:

a plurality of antenna elements;

a fixed directivity creation section that creates a plurality of fixed directivity reception signals by combining outputs of said plurality of antenna elements using a plurality of fixed weight patterns;

delay profile creation sections that create a delay profile for each of said plurality of directivity reception signals;

an arrival direction estimation section that estimates a direction of arrival of a transmission wave by detecting peaks that appear in said plurality of delay profiles;

a beam steering reception section that scans directivity beams within a predetermined angular range and acquires a reception signal in a direction in which a highest reception level is obtained; and a scanning range selection section that selects a scanning range of said beam steering reception section based on said estimated direction.

3. The radio reception apparatus according to claim 1, wherein, when maximum peak values detected in two delay profiles by said arrival direction estimation section exceed the maximum peak values detected in all other delay profiles and the maximum peak values detected in the two delay profiles are close in value, said adaptive directivity creation section calculates the adaptive weight using a fixed weight, corresponding to a direction between the directions of the corresponding profiles having the threshold-exceeding maximum peak values, as an initial value weight of an optimization algorithm.

4. The radio reception apparatus according to claim 1, wherein, when peaks exceeding a threshold are detected in non-adjacent directivity directions by said arrival direction estimation section, said adaptive directivity creation section calculates the adaptive weight using a weight, which enables all directions to be covered over a range in which the threshold-exceeding peaks were detected, as an initial value weight of an optimization algorithm.

5. The radio reception apparatus according to claim 1, further comprising an SIR detection section that detects a signal to interference ratio (SIR value) of the adaptive directivity reception signal obtained by said adaptive directivity creation section, wherein, when the detected SIR value is less than a predetermined value:

the arrival direction estimation section estimates the direction of arrival of another transmission wave by detecting peaks that appear in delay profiles corresponding to this other transmission wave, and the adaptive weight used for creating a revised adaptive directivity reception signal is re-calculated using a new fixed weight, utilized when creating a fixed directivity reception signal corresponding to a delay profile in which a maximum peak was detected in the other transmission wave, as the initial value weight.

6. The radio reception apparatus according to claim 1, wherein, when it is detected by said arrival direction estimation section that a delay profile in which a peak appear switches instantaneously, said adaptive directivity creation section creates an adaptive directivity reception signal using a fixed weight corresponding to a fixed directivity in which a maximum peak was detected as an adaptive weight.

7. A radio communication apparatus comprising:

the radio reception apparatus according to claim 1; and a transmission apparatus that sends a transmission signal with the same directivity as the adaptive directivity reception signal by composing the transmission signal using a weight calculated by the adaptive directivity creation section of said radio reception apparatus, wherein, when a local station transmission power control signal received from a communicating party indicates that local station transmission power is to be increased for a specific period or longer:

the arrival direction estimation section estimates the direction of arrival of another transmission wave by detecting peaks that appear in the delay profiles corresponding to this other transmission wave, and the adaptive weight used for creating a revised adaptive directivity reception signal is re-calculated using a new fixed weight, which is utilized when creating a fixed directivity reception signal corresponding to a delay profile in which a maximum peak is detected in the other transmission wave, as the initial value weight.

8. A directivity reception method comprising the steps of:

(a) creating a plurality of fixed directivity reception signals by combining outputs of a plurality of antenna elements using a plurality of fixed weight patterns;

(b) creating a delay profile for each of said plurality of fixed directivity reception signals;

(c) estimating a direction of arrival of a transmission wave by detecting peaks that appear in said plurality of delay profiles;

(d) calculating an adaptive weight to be multiplied by a plurality of reception signals obtained by said plurality of antenna elements based on said estimated direction; and (e) creating an adaptive directivity reception signal by combining said reception signals using said calculated adaptive weight, wherein, step (e) comprises calculating the adaptive weight using a fixed weight, utilized when creating a fixed directivity reception signal corresponding to a delay profile in which a maximum peak was detected, as an initial value weight of an optimization algorithm.

9. A directivity reception method comprising the steps of:

(a) creating a plurality of fixed directivity reception signals by combining outputs of a plurality of antenna elements using a plurality of fixed weight patterns;

(b) creating a delay profile for each of said plurality of fixed directivity reception signals;

(c) estimating a direction of arrival of a transmission wave by detecting peaks that appear in said plurality of delay profiles;

(d) selecting a scanning range in accordance with said estimated direction; and (e) scanning directivity beams within said selected scanning range and acquiring a reception signal in a direction in which a highest reception level is obtained.

* * * * *